US005893656A

United States Patent [19]
Manico

[11] Patent Number: 5,893,656
[45] Date of Patent: Apr. 13, 1999

[54] FILM CARTRIDGE WITH VISUAL EXPOSURE STATUS INDICATOR

[75] Inventor: Joseph A. Manico, Rochester, N.Y.

[73] Assignee: Eastman Kodak Company, Rochester, N.Y.

[21] Appl. No.: 08/851,838

[22] Filed: May 7, 1997

[51] Int. Cl.⁶ .................................................. G03B 17/26
[52] U.S. Cl. .................................................. 396/515
[58] Field of Search .................................. 396/515, 207

[56] References Cited

U.S. PATENT DOCUMENTS

| | | | |
|---|---|---|---|
| 5,629,749 | 5/1997 | Tsukahara et al. | 396/515 |
| 5,708,879 | 1/1998 | Manico et al. | 396/515 |
| 5,715,494 | 2/1998 | Harris et al. | 396/515 |

Primary Examiner—David M. Gray
Attorney, Agent, or Firm—Roger A. Fields

[57] ABSTRACT

A film cartridge comprises a rotatable film spool, and a film exposure status indicator capable of changing state to provide a visual indication of the exposure status of a filmstrip for the film cartridge. The film exposure status indicator includes a film exposed indication positioned to be seen, and a dry erasable coating that covers the film exposed indication to conceal the film exposed indication from view and that can be erased to reveal the film exposed indication. A wiper device for erasing the erasable coating is positioned in contact with the erasable coating. Either one of the film exposed status indicator and the wiper device is connected to the film spool for rotation with the film spool relative to whichever one of the film exposed status indicator and the wiper device is not connected to the film spool, whereby the relative movement between the film exposed status indicator and the wiper device will cause the wiper device to erase the erasable coating.

14 Claims, 5 Drawing Sheets

FILM CARTRIDGE WITH VISUAL EXPOSURE STATUS INDICATOR

CROSS-REFERENCE TO RELATED APPLICATION

Reference is made to commonly assigned application Ser. No. 08/781,766, entitled FILM CARTRIDGE WITH VISUAL EXPOSURE STATUS INDICATOR and filed Jan. 10, 1997 in the name of Joseph A. Manico & John A. Agostinelli.

FIELD OF THE INVENTION

The invention relates generally to the field of photography, and in particular to a film cartridge with a visual exposure status indicator for indicating whether a filmstrip inside the cartridge housing is unexposed or exposed. More specifically, the invention relates to a film exposure status indicator that can be used with a conventional type cartridge.

BACKGROUND OF THE INVENTION

It is known for a film cartridge to have a film exposure status indicator for providing a visual indication that a filmstrip inside the cartridge housing has been exposed. Often, the film exposure status indicator is one which cannot be used with a conventional type cartridge, but instead requires a special or new cartridge.

For example, prior art U.S. Pat. No. 5,278,600, issued Jan. 11, 1994, discloses an atypical film cartridge comprising a film spool rotatable inside the cartridge housing, an indicator window in an end cap of the cartridge housing, an annular indicator wheel rotatable inside the cartridge housing behind the indicator window to move a film exposed indication on the indicator wheel to the indication window, and an annular drive wheel rotatably linked with the film spool for rotating the indicator wheel to move the film exposed indication to the indication window. A pin and receiver clutch device transmits movement of the drive wheel to the indicator wheel when the film spool is rotated in a film unwinding direction, and leaves the indicator wheel and the drive wheel disconnected when the film spool is rotated in a film winding direction. Since the indicator wheel is located inside the cartridge housing, it cannot be used with a conventional type cartridge.

The Cross-Referenced Application

The cross-referenced application discloses a film cartridge comprising a cartridge housing, a film spool rotatable inside the cartridge housing, and a film exposure status indicator capable of changing state to provide a visual indication of the exposure status of a filmstrip for the film cartridge. A ring having a radial slit coaxially engages the film spool to be rotated concurrently with the film spool. The film exposure status indicator is a flexible helix coiled around the film spool and extending through the slit. One end portion of the helix is fixed in place beneath the ring to be concealed from view and to prevent rotation of the helix when the ring is rotated with the film spool. A further portion of the helix is initially located above the ring to be visible and is adapted to be compressed beneath the ring to disappear from view responsive to movement of the slit along the further portion when the ring is rotated with the film spool. This provides a change of state of the helix from being visible above the ring to being concealed beneath the ring. The ring and the helix are designed to fit as a unit on a protruding end portion of the film spool which projects from the cartridge housing and, therefore, can be used with a conventional type cartridge.

SUMMARY OF THE INVENTION

According to one aspect of the invention, a film cartridge comprising a rotatable film spool, and a film exposure status indicator capable of changing state to provide a visual indication of the exposure status of a filmstrip for the film cartridge, is characterized in that:

the film exposure status indicator includes a film exposed indication positioned to be seen, and a dry erasable coating that covers the film exposed indication to conceal the film exposed indication from view and that can be erased to reveal the film exposed indication;

a wiper device for erasing the erasable coating is positioned in contact with the erasable coating; and either one of the film exposed status indicator and the wiper device is connected to the film spool for rotation with the film spool relative to whichever one of the film exposed status indicator and the wiper device is not connected to the film spool, whereby the relative movement between the film exposed status indicator and the wiper device will cause the wiper device to erase the erasable coating.

According to another aspect of the invention, a film exposure status indicator that is be used with a film cartridge having a rotatable film spool, and is capable of changing state to provide a visual indication of the exposure status of a filmstrip for the film cartridge, comprises:

a film exposed indication positioned to be seen;

a dry erasable coating that covers the film exposed indication to conceal the film exposed indication from view and that can be erased to reveal the film exposed indication;

a wiper device for erasing the erasable coating is positioned in contact with the erasable coating to erase the erasable coating; and either one of the erasable coating and the wiper device can be connected with the film spool for rotation with the film spool relative to whichever one of the erasable coating and the wiper device is not connected to the film spool, whereby the relative movement between the erasable coating and the wiper device will cause the wiper device to erase the erasable coating.

DETAILED DESCRIPTION OF THE INVENTION

The invention is disclosed as being embodied preferably in a 35 m film cartridge. Because the features of a 35 mm film cartridge are generally known, the description which follows is directed in particular only to those elements forming part of or cooperating directly with the disclosed embodiment. It is to be understood, however, that other elements may take various forms known to a person of ordinary skill in the art.

Preferred Embodiment (FIGS. 1–4)

Figure 1:
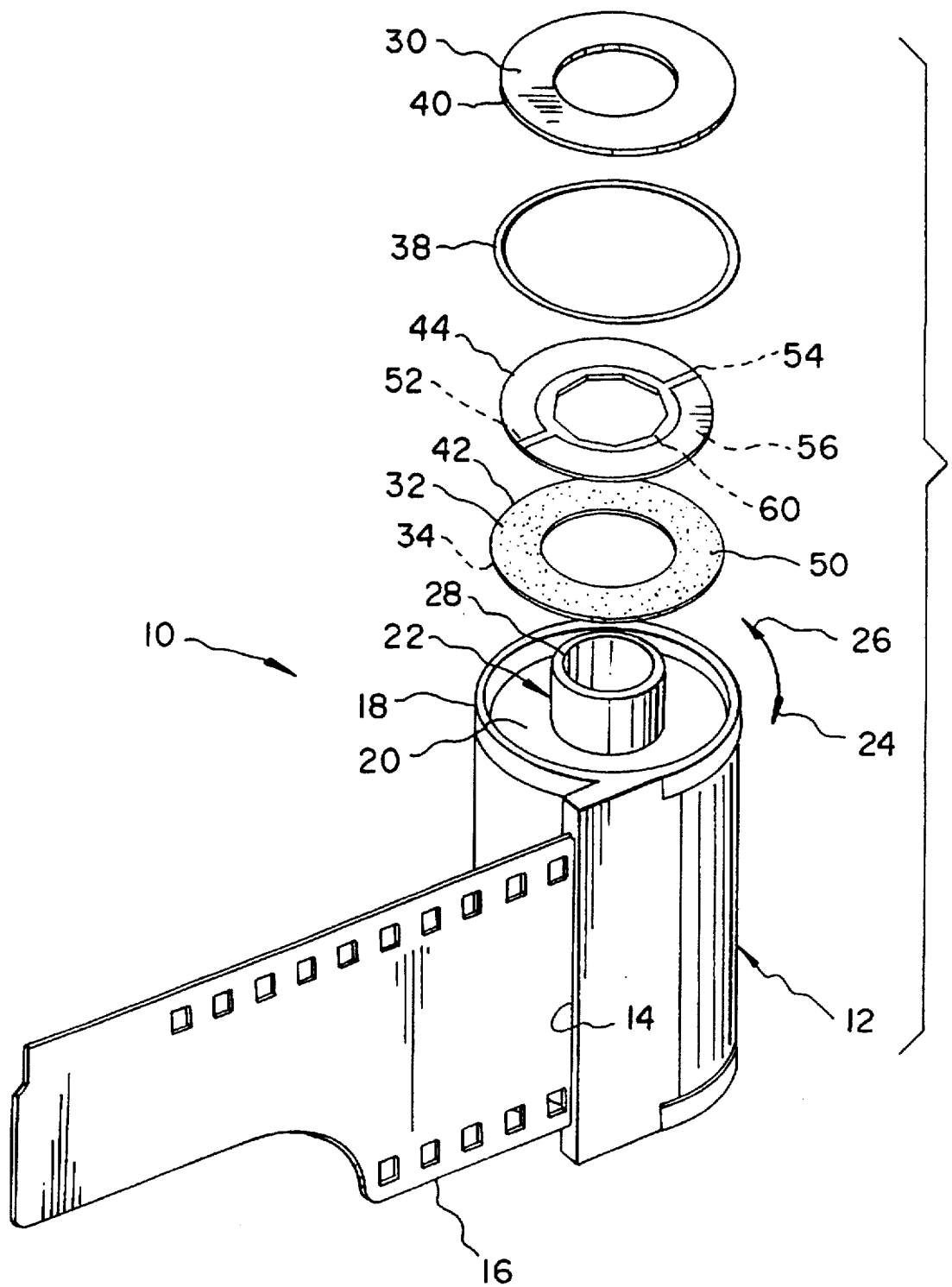
FIG. 1 is an exploded perspective view of a film cartridge with a visual exposure indicator pursuant to a preferred embodiment of the invention.

Referring now to the drawings, FIG. 1 shows a 35 mm film cartridge 10 comprising a cartridge housing 12 having a plush-lined light-trapping film egress/ingress opening 14 for a filmstrip 16 and a peripherally raised end cap 18 that forms an open-top recess 20. A flanged film spool 22 rotatable inside the cartridge housing 12 in opposite film unwinding and rewinding directions 24 and 26 has a protruding spool end portion 28 coaxially projecting from the cartridge housing into the recess 20.

Figure 2:
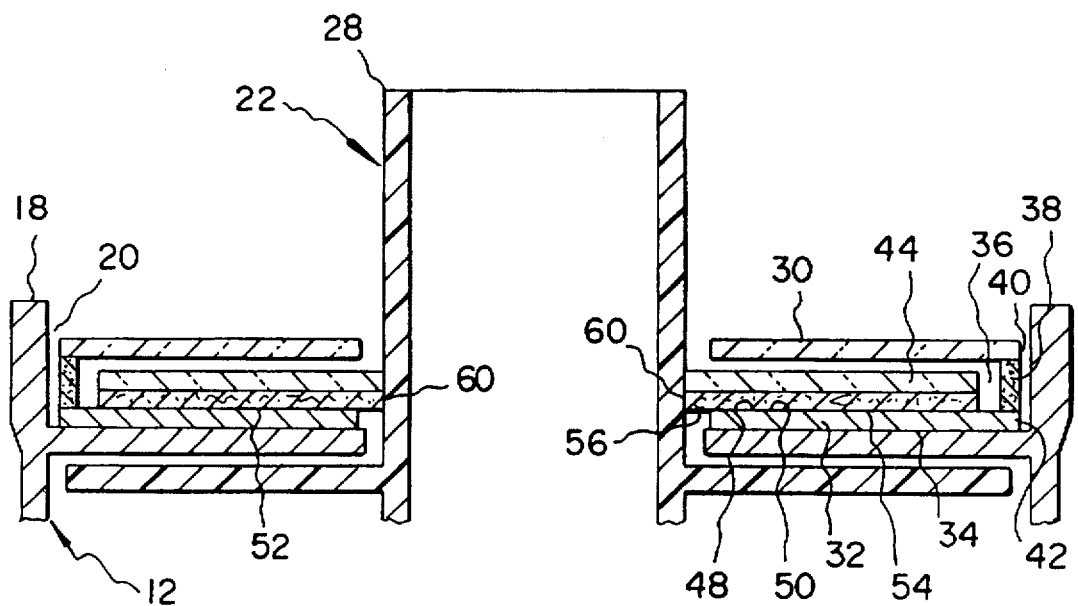
FIG. 2 is a cross-section view of the film cartridge depicted in FIG. 1.

Within the recess 20, there is provided a outer cover ring 30 which is transparent, and an inner indicator ring 32 which is adhered on its underside 34 to the cartridge housing 12. The outer cover ring 30 and the inner indicator ring 32 have the same outside and inside diameters and are spaced apart to leave a gap 36 in-between the two rings, as shown in FIG. 2. A relatively narrow adhesive spacer ring 38 having the same outside diameter as the outer cover ring 30 and the inner indicator ring 32, but a greater inside diameter than the outer cover ring and the inner indicator ring, interconnects the outer cover ring and the inner indicator ring adjacent their respective peripheral edges 40 and 42. A wiper ring 44, which is transparent, is located between the outer cover ring 30 and the inner indicator ring 32, in the gap 36, concentrically spaced inward of the spacer ring 38 as shown in FIG. 2. The spool end portion 28 extends through the inner indicator ring 32, the concentric spacer and wiper rings 36 and 44, and the outer cover ring 30. The cover and indicator rings 30 and 32, although being fixed in place, do not impede rotation of the spool end portion 28 in the film unwinding and rewinding directions 24 and 26. The wiper ring 44 is coaxially connected to the spool end portion 28 to rotate with spool end portion in the film unwinding and winding directions 24 and 26.

The indicator ring 32 has a film exposed indication "USED" 46 on its top side 48 and a known opaque, non-toxic, dry erasable ink coating 50 that directly covers (conceals) the film exposed indication. See FIGS. 3 and 4. The ink coating 50 can be wiped off the indicator ring 32, to permit the film exposed indication 46 to be seen, with a dry cloth, tissue, pile, or other suitable wiping material, or it can be scraped off using some sort of a scraper device.

A pair of identical radially aligned wiper fabric pads 52 and 54 are positioned on the underside 56 of the transparent wiper ring 44 in contact with the ink coating 50 on the indicator ring 32. The wiper fabric pads 52 and 54 are constructed of a pile material having numerous dense fibers 58 obliquely angled from the underside 56 of the wiper ring 44 in the film rewinding direction 26 to rub the ink coating 50 off the indictor ring 32 to reveal the film exposed indication 46, only when the wiper ring is repeatedly rotated with the film spool 22 in the film rewinding direction. See FIGS. 2–5. Then, the film exposed indication 46 can be seen on the indicator ring 32, through the transparent wiper and cover rings 44 and 30.

A wiper fabric annulus 60 is positioned on the underside 56 of the wiper ring 44, adjacent the indicator ring 32 as shown in FIGS. 1 and 2, to trap any particles of the ink coating 50 that are rubbed off the indicator ring. The wiper fabric annulus 60 is constructed of the same pile material as is the wiper fabric pads 52 and 54.

Figure 7:
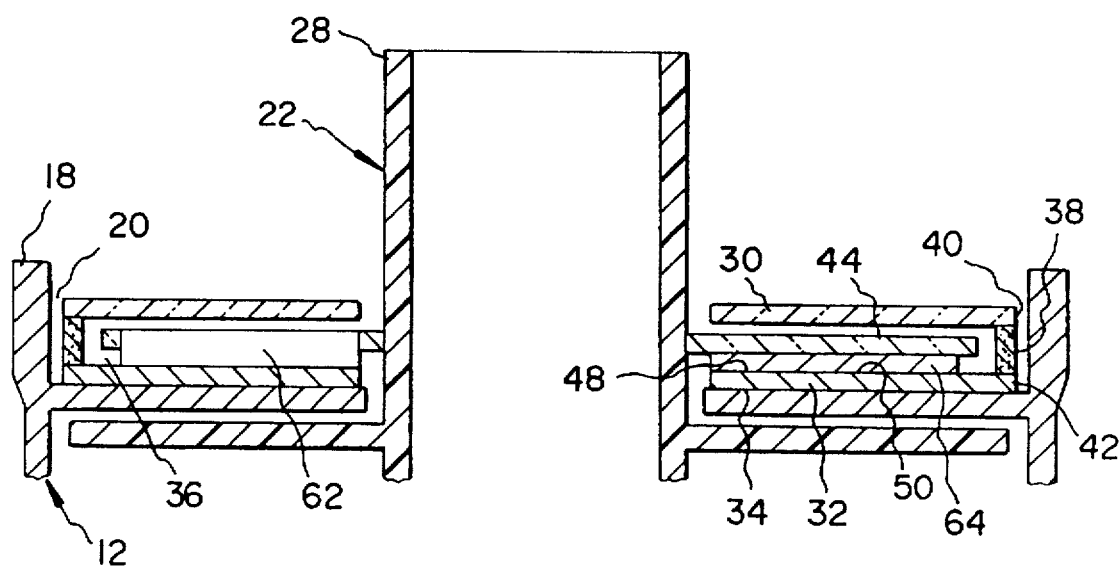
FIG. 7 is a cross-section view of the film cartridge depicted in FIG. 6.
Figure 3:
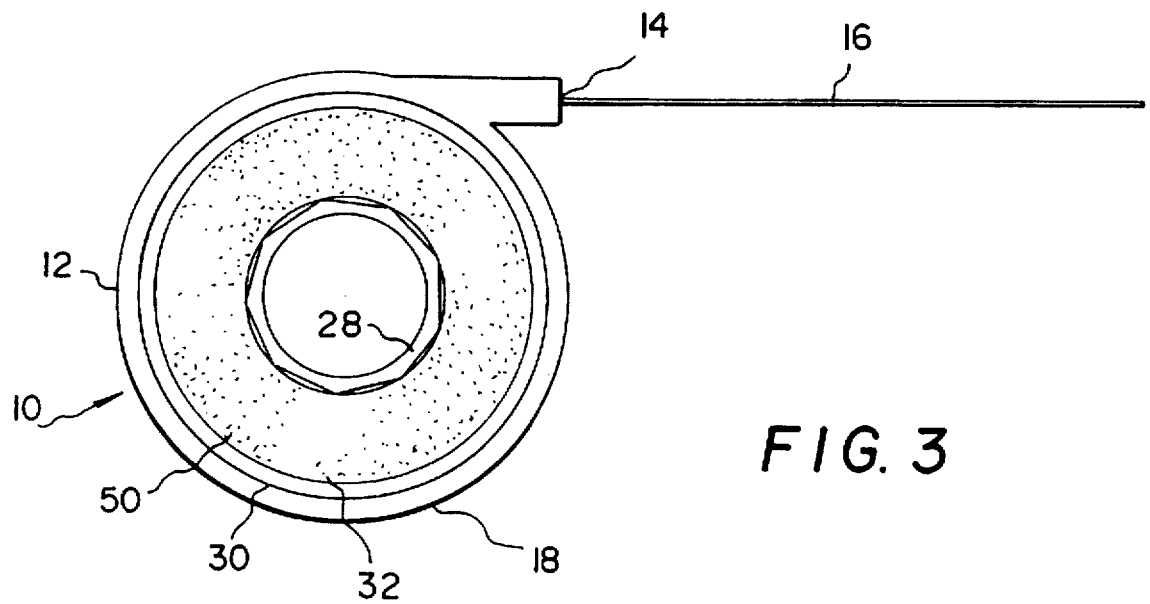
FIGS. 3 and 4 are top plan views of the film cartridge, showing the visual exposure indicator in film-unexposed and film-exposed states.
Figure 4:
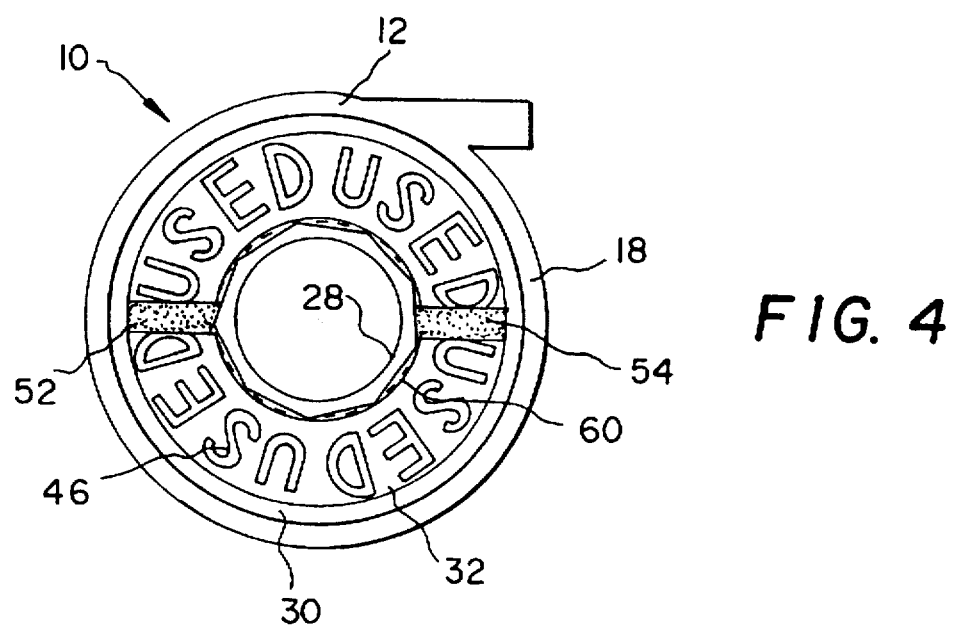
Figure 5:
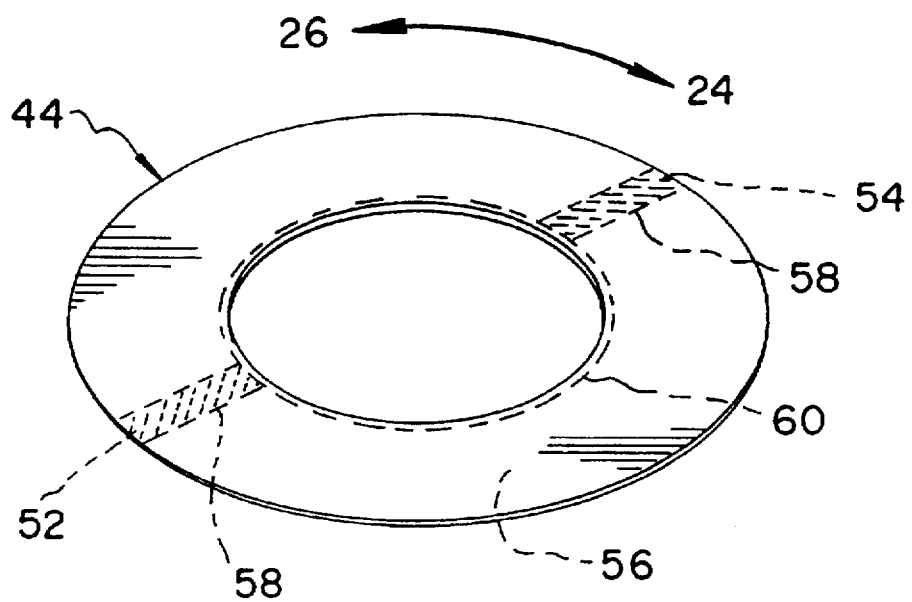
FIG. 5 is a top perspective view of a wiper ring of the visual exposure indicator.
Figure 8:
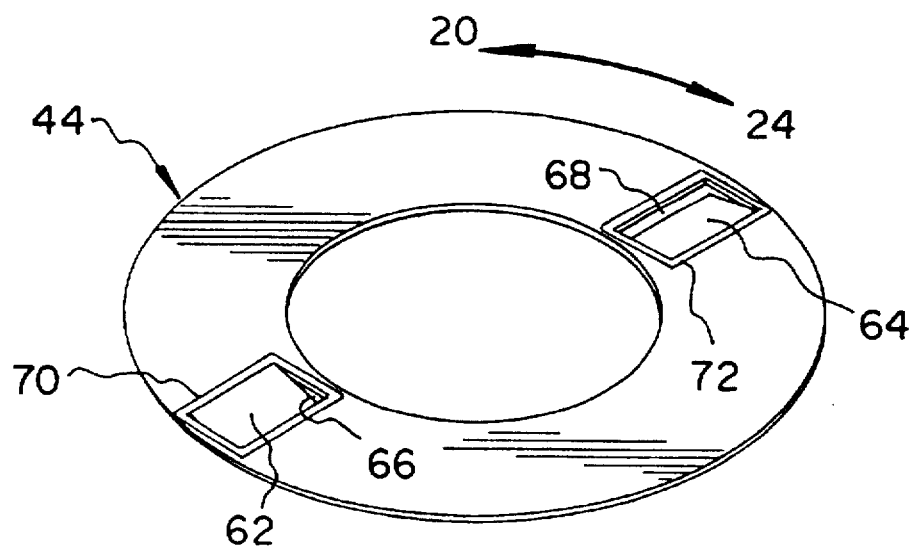
FIG. 8 is a top perspective view of a wiper ring of the visual exposure indicator.
Figure 6:
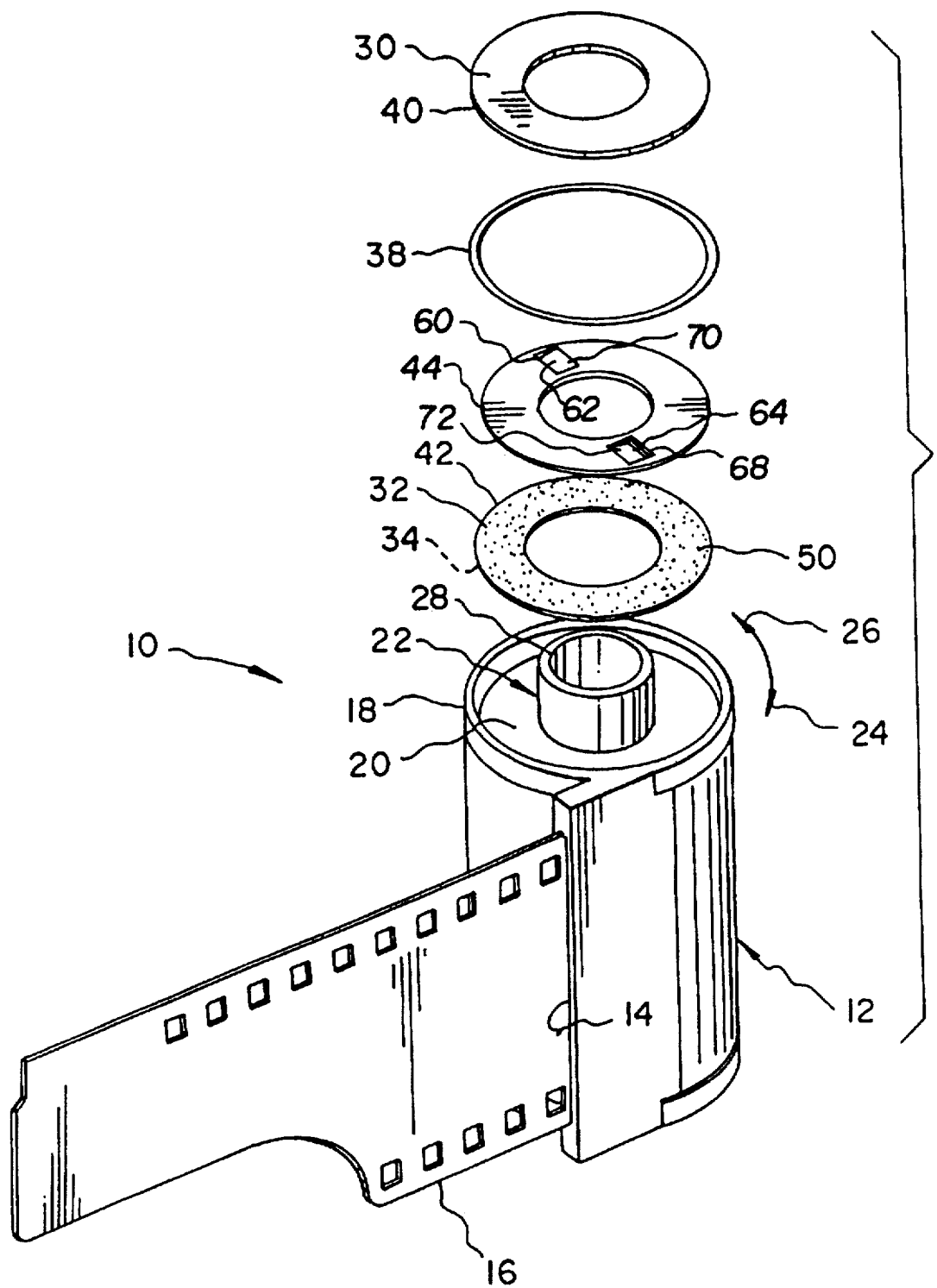
FIG. 6 is an exploded perspective view of a film cartridge with a visual exposure indicator pursuant to an alternate embodiment of the invention.

Alternate Embodiment (FIGS. 6–8)

The alternate embodiment shown in FIGS. 6–8 is identical to the preferred embodiment shown in FIGS. 1–5, except that in place of the two wiper fabric pads 52 and 54 and the wiper fabric annulus 60 there is provided a pair of wiper blades 62 and 64 positioned the underside 56 of the transparent wiper ring 44 in contact with the ink coating 50 on the indicator ring 32. The wiper blades 62 and 64 are obliquely angled from the underside 56 of the wiper ring 44 in the film rewinding direction 26 to rub the ink coating 50 off the indictor ring 32 to reveal the film exposed indication 46, only when the wiper ring is repeatedly rotated with the film spool 22 in the film rewinding direction. See FIGS. 6–8. Then, the film exposed indication 46 can be seen on the indicator ring 32, through the transparent wiper and cover rings 44 and 30.

Respective holes 66 and 68 are positioned in the wiper ring 44 adjacent the wiper blades 62 and 64 to receive any particles of the ink coating 50 that are scraped off the indicator ring 32. Discrete adhesive tape segments 70 and 72 cover the holes 66 and 68 to hold or trap the scraped off particles of the ink coating 50. See FIGS. 6 and 7

The invention has been described with reference to a preferred embodiment. However, it will be appreciated that variations and modifications can be effected by a person of ordinary skill in the art without departing from the scope of the invention.

PARTS LIST 10. film cartridge
12. cartridge housing
14. film egress/ingress opening
16. filmstrip
18. peripherally raised end cap
20. open-top recess
22. film spool
24. film unwinding direction
26. film rewinding direction
28. protruding spool end portion
30. transparent outer cover ring
32. inner indicator ring
34. indicator ring underside
36. gap
38. adhesive spacer ring
40. cover ring peripheral edge
42. indicator ring peripheral edge
44. transparent wiper ring
46. film exposed indication
48. indicator ring top side
50. erasable ink coating
52. wiper fabric pad
54. wiper fabric pad
56. wiper ring underside
58. wiper fibers
60. wiper annulus
62. wiper blade
64. wiper blade
66. hole
68. hole
70. adhesive tape segment
72. adhesive take segment

What is claimed is:

1. A film cartridge comprising a rotatable film spool, and a film exposure status indicator capable of changing state to provide a visual indication of the exposure status of a filmstrip for said film cartridge, is characterized in that:

said film exposure status indicator includes a film exposed indication positioned to be seen, and a dry erasable coating that covers said film exposed indication to conceal the film exposed indication from view and that can be erased to reveal the film exposed indication;

a wiper device for erasing said erasable coating is positioned in contact with the erasable coating; and either one of said film exposed status indicator and said wiper device is connected to said film spool for rotation with the film spool relative to whichever one of the film exposed status indicator and the wiper device is not connected to the film spool, whereby the relative movement between said film exposed status indicator and said wiper device will cause the wiper device to erase said erasable coating.

2. A film cartridge as recited in claim 1, wherein said wiper device includes at least one wiper fabric pad positioned in contact with said erasable coating to rub off the erasable coating when said film spool is rotated.

3. A film cartridge as recited in claim 1, wherein said wiper device includes at least one wiper blade positioned in contact with said erasable coating to scrape off the erasable coating when said film spool is rotated.

4. A film cartridge comprising a cartridge housing, a film spool rotatable inside said cartridge housing and having a protruding spool end portion coaxially projecting from the cartridge housing, and a film exposure status indicator capable of changing state to provide a visual indication of the exposure status of a filmstrip for said film cartridge, is characterized in that:

said film exposed status indicator includes an indicator ring surrounding said protruding spool end portion in spaced relation and affixed to said cartridge housing to permit rotation of said film spool without rotating said indicator ring, a film exposed indication positioned on said indicator ring to be seen, and an opaque dry erasable ink coating on said indicator ring that covers said film exposed indication to conceal the film exposed indication from view and that can be erased to reveal the film exposed indication; and a wiper device is connected to said protruding spool end portion for rotation with said film spool and in contact with said erasable ink coating to erase the ink coating.

5. A film cartridge as recited in claim 4, wherein said wiper device includes a transparent wiper ring coaxially connected over said indicator ring to said protruding spool end portion for rotation with said film spool, and at least one wiper element positioned on an underside of said transparent wiper ring in contact with said erasable ink coating to erase the ink coating, when the wiper ring is rotated, to permit said film exposed indication to be seen through the transparent wiper ring.

6. A film cartridge as recited in claim 5, wherein said wiper element includes at least one wiper fabric pad positioned in contact with said erasable ink coating to rub the ink coating off said indicator ring when said wiper ring is rotated, and a wiper fabric annulus positioned adjacent said indicator ring to trap any particles of said erasable ink coating that are wiped off the indicator ring.

7. A film cartridge as recited in claim 6, wherein said film spool is rotatable in opposite film unwinding and film rewinding directions, and said wiper fabric pad is constructed of a pile material having a plurality of fibers obliquely angled from said wiper ring in the film rewinding direction to rub said erasable ink coating off said indicator ring only when said film spool is rotated in the film rewinding direction.

8. A film cartridge as recited in claim 5, wherein said wiper element includes at least one wiper blade positioned in contact with said erasable ink coating to scrape the ink coating off said indicator ring when said wiper ring is rotated, a hole in said wiper ring positioned adjacent said wiper blade to receive any particles of said erasable ink coating that are scraped off said indicator ring, and a discrete adhesive covering said hole to hold the scraped off particles of said erasable ink coating.

9. A film cartridge as recited in claim 8, wherein said film spool is rotatable in opposite film unwinding and film rewinding directions, and said wiper blade is obliquely angled from said wiper ring in the film rewinding direction to scrape said erasable ink coating off said indicator ring only when said film spool is rotated in the film rewinding direction.

10. A film cartridge comprising a cartridge housing with a peripherally raised end cap which forms an open recess, a film spool rotatable inside said cartridge housing and having a protruding spool end portion coaxially projecting from the cartridge housing into said open recess, and a film exposure status indicator capable of changing state to provide a visual indication of the exposure status of a filmstrip for said film cartridge, is characterized in that:

said film exposed status indicator includes an indicator ring within said open recess which surrounds said protruding spool end portion in spaced relation and is affixed to said cartridge housing to permit rotation of said film spool without rotating said indicator ring, a film exposed indication positioned on said indicator ring to be seen, and an opaque dry erasable ink coating on said indicator ring that covers said film exposed indication to conceal the film exposed indication from view and that can be erased to reveal the film exposed indication;

a transparent wiper ring within said open recess is coaxially connected over said indicator ring to said protruding spool end portion for rotation with the protruding spool end;

at least one wiper element is positioned on an underside of said transparent wiper ring in contact with said erasable ink coating to erase the ink coating, when the wiper ring is rotated, to permit said film exposed indication to be seen through said transparent wiper ring;

a transparent outer cover ring within said open recess surrounds said protruding spool end portion in spaced relation to permit rotation of said film spool and is separated from said indicator ring, leaving a gap in-between said outer cover ring and the indicator ring for said wiper ring; and an adhesive spacer ring within said gap is positioned concentrically about said wiper ring in spaced relation to permit rotation of the wiper ring and interconnects said transparent outer ring and said indicator ring to prevent the outer ring from being rotated.

11. A film exposure status indicator that is be used with a film cartridge having a rotatable film spool, and is capable of changing state to provide a visual indication of the exposure status of a filmstrip for the film cartridge, comprises:

a film exposed indication positioned to be seen;

a dry erasable coating that covers said film exposed indication to conceal the film exposed indication from view and that can be erased to reveal the film exposed indication;

a wiper device for erasing said erasable coating is positioned in contact with the erasable coating to erase the erasable coating; and either one of said erasable coating and said wiper device can be connected with the film spool for rotation with the film spool relative to whichever one of the erasable coating and the wiper device is not connected to the film spool, whereby the relative movement between said erasable coating and said wiper device will cause the wiper device to erase the erasable coating.

12. A film exposure status indicator as recited in claim 11, wherein said wiper device includes at least one wiper fabric pad positioned in contact with said erasable coating to rub off the erasable coating when one of the erasable coating and the wiper device is rotated relative to the other.

13. A film exposure status indicator as recited in claim 11, wherein said wiper device includes at least one wiper blade positioned in contact with said erasable coating to scrape off the erasable coating when one of the erasable coating and the wiper device is rotated relative to the other.

14. A film exposure status indicator as recited in claim 11, wherein said film exposed indication and said erasable coating are supported on an indicator ring, and said wiper device includes a transparent wiper ring and at least one wiper element that is positioned on an underside of said transparent wiper ring in contact with said erasable coating to erase the erasable coating to permit said film exposed indication to be seen through the transparent wiper ring when the erasable coating is erased.

* * * * *